Figure 1:
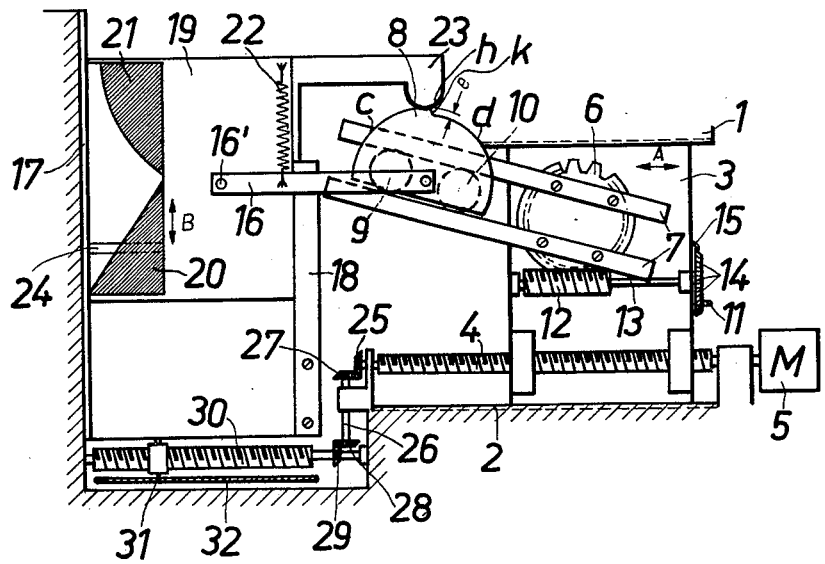

April 7, 1964 W. MULLER 3,128,328
DEVICES FOR MEASURING AND RECORDING EXTINCTION COEFFICIENTS
Filed Aug. 8, 1960 2 Sheets-Sheet 1

Inventor
Wiefried Müller

April 7, 1964   W. MULLER   3,128,328
DEVICES FOR MEASURING AND RECORDING EXTINCTION COEFFICIENTS
Filed Aug. 8, 1960   2 Sheets-Sheet 2

Inventor
Wilfried Müller 3,128,328
DEVICES FOR MEASURING AND RECORDING
EXTINCTION COEFFICIENTS
Wilfried Muller, Jena, Germany, assignor to
VEB Carl Zeiss Jena, Jena, Germany
Filed Aug. 8, 1960, Ser. No. 48,331
1 Claim. (Cl. 88—14)

This invention relates to a device for measuring and recording extinction and absorption coefficients, particularly in photometers and preferably for measuring paper electropherograms, which has for the test specimen a measuring organ displaceable into the ray path of the photometer and controlling through its displacement the movements of a stylus.

The known devices of this kind have only one diaphragm, which is displaceable into the ray path of a photometer and requires being interchanged with another for instance when measurement in oncoming light is to be followed up by measurement in transmitted light or vice versa. Such changes are not always quite easy and generally considered as a nuisance particularly on account of the inherent waste of time in routine examinations. Moreover, the measuring organ can all too easily be brought out of adjustment, which gives rise to uncontrollable measuring errors and may damage the said organ and the means supporting it.

The present invention aims at overcoming these disadvantages by providing a measuring organ consisting of two different diaphragms or gray wedges which have a common support displaceable transversely to the ray paths and only one of which is effective at a time. By operating a handle, the desired diaphragm can be easily interposed into the ray path of the subjectively or objectively working photometer without time-consuming manipulations at the apparatus.

When paper electropherograms or chromatograms are being measured, the extinction in the middle of the paper strip is on account of irregularities in the substance of the strip often smaller than what had been taken as the normal value when zero was adjusted, the consequence being that at such parts of the strip the center of the ray pencil produced by a slit will depart from the zero line of the measuring organ, so that, if the measuring organs contact each other, it is impossible to exactly record the true extinction curve. Advantageously, the zero lines of the two measuring organs do not therefore coincide but have a distance apart equal to or greater than the width of the slit, without the measuring organs overlapping each other. Provision is made also of suitable mechanical, optical or electron-chemical means which during the process of changing from the one measuring organ to the other displace the support additionally an amount equal to the distance apart of the zero lines.

As the extinction coefficients and, accordingly, the deflections of the stylus depend on the concentration of the material of the test specimen, it is advisable in the interest of obtaining good records also of extreme values to provide means which transmit the adjustments of the measuring organs to the stylus on a greater or a smaller scale.

Advantageously the support of the measuring organs has an entrainment means extending into a guide rotatably mounted on a slide the movements of which influence the support of the measuring organs, the directions of displacement of the support and the slide being at right angles to each ohter. The angle of rotation of the guide can be measured by known means.

Finally, it is recommendable for the additional displacement of the support to dispose the entrainment means on a cam disk rotatably mounted on a lever hinged to the support and to provide that the cam disk has two circular guideways of different radii for an arm of the support and is held by a spring in constant contact with this arm.

Figure 2:
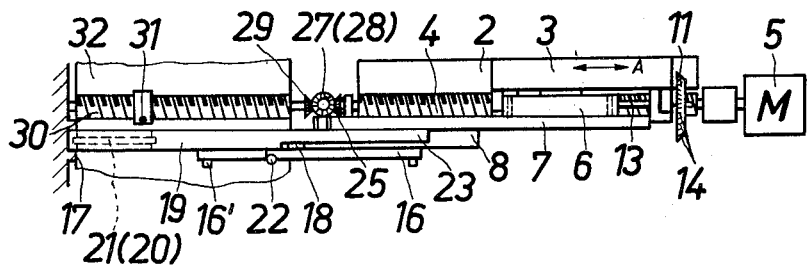
Figure 3:
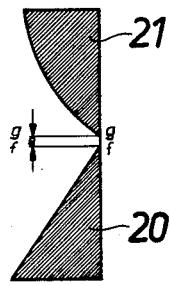
Figure 4:
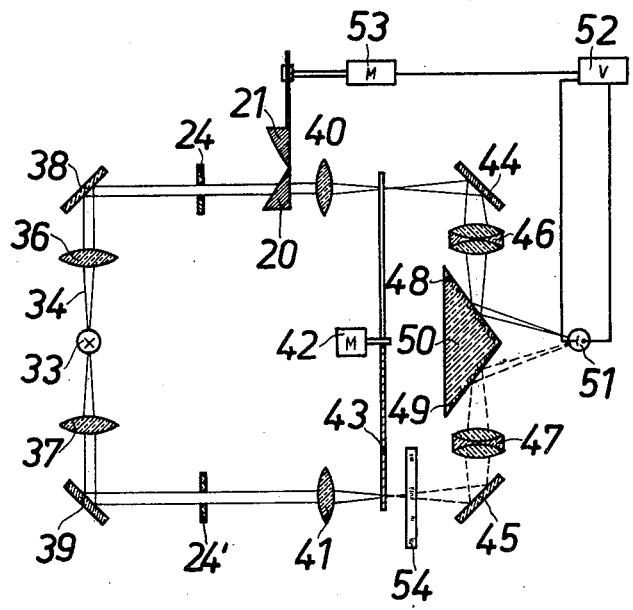

In the accompanying drawings, which illustrate schematically an embodiment of the invention, FIG. 1 is a side view of the device,
FIG. 2 is a plan view of the device,
FIG. 3 shows the diaphragms, and
FIG. 4 shows the device in a schematically represented photoelectrical photometer.

A slide 3 displaceable along guides 1, 2 in a direction A indicated by arrows is actuated by a spindle 4 rotated by a motor 5. On the slide 3 is mounted a worm gear 6 rigidly connected to a guide 7 of an entrainment means consisting of two rollers 9, 10 fixed to a cam disk 8. For rotating the worm gear 6, the slide 3 has a handwheel 11 fast with a shaft 13 bearing a slug 12 in mesh with the worm gear 6. The handwheel 11 has a circumferential scale 14 working against an index 15 fast with the slide 3.

The cam disk 8, whose curves are arcs $c$, $d$ of different radii, is rotatably mounted on a lever 16 hinged to a pin 16' fast with a slide 19. The slide 19 is displaceable in the direction of an arrow B along guides 17, 18 and carries two different diaphragms 20, 21. The axis of rotation of the cam disk 8 contains the center of the two arcs $c$, $d$. A spiral spring 22, the one end of which is attached above the pin 16' of the lever 16 to the slide 19 and the other end of which is fast with the lever 16, draws the end of the lever 16 carrying the cam disk 8 towards the gliding surface $h$ of an arm 23 fast with the diaphragm slide 19, so that the disk 8 and the surface $h$ are in continuous contact with each other. In the drawing, the diaphragm in operation is diaphragm 20. The zero lines $f$—$f$ and $g$—$g$ (FIG. 3) of the diaphragms 20 and 21, respectively, have a distance apart $e$ which is equal to the breadth of the slit 24 producing the ray pencil.

That end of the spindle 4 which is remote from the motor 5 has a bevel gear 25. This gear 25 engages over bevel gears 27 and 28 on a common shaft a bevel gear 29 fast with and coaxial to a spindle 30. This spindle 30 operates a stylus 31 (whose guides are omitted in the drawing). The movements of the stylus 31 are transmitted to a strip of paper 32 moving in FIG. 1 at right angles to the plane of the drawing.

If a change occurs in the intensity of the ray pencil produced by the slit 24, the diaphragm 20 must be so adjusted as to reestablish the original light intensity. To this end the slide 3 is displaced in its guides 1 and 2. This displacement is transmitted over the guide 7, the rollers 9 and 10, the cam disk 8, and the arm 23 and also by the lever 16 to the diaphragm slide 19 in such a manner that displacement of the slide 3 in the direction A is followed up by displacement of the diaphragm slide 19 in the direction B at right angles to A. Analogously to the adjustment of the diaphragm 20, the stylus 31 is displaced relatively to the paper strip 32 by means of the two pairs of bevel gears 25, 27 and 28, 29 and the spindle 30.

If the intensity of the ray pencil diminishes, the diaphragm 20 is made to cover a smaller part of the ray-pencil cross-section so as to reestablish the original light intensity, which can be achieved only by displacing the support of the diaphragm 20 in the guides 17 and 18 downward (FIG. 1). The motor 5 must, accordingly, actuate the spindle 4 in such a manner that the slide 3 is displaced in its guides 1 and 2 towards the left.

When the device has its initial adjustment, the guide 7 and the lever 16 are parallel to the direction of displacement A of the slide 3, the boundary lines of the light pencil coincide exactly with the zero lines of the diaphragms, and the circular gliding surface $h$ of the arm 23 touches the cam disk 8 on the curve $k$ interconnecting the two arcs $c$ and $d$, the radii of these arcs being exactly balanced relatively to each other and the difference of these radii being equal to the distance apart $e$ of the zero lines of the two diaphragms 20 and 21 and, accordingly, to the breadth of the slit 24. If a measurement is desired to be made by means of the lower diaphragm 20, the guide 7 must be turned upward by means of the handwheel 11. If a measurement is to be made by means of the upper diaphragm 21, the guide 7 is to be turned downward. The turning angle is in both cases a measure of the diaphragm adjustment relative to the displacement of the stylus.

In FIG. 4, a light source 33 emits light pencils 34, 35 in two directions opposite to each other. By means of, respectively, lenses 36 and 37, deviating mirrors 38 and 39, slits 24 and 24' and lenses 40 and 41, each of these two light pencils 34 and 35 is combined to an image of the light source 33 in the plane of a diaphragm plate 43 rotatable by means of a synchronous motor 42. By means respectively of mirrors 44 and 45, imaging optics 46 and 47 and the reflecting surfaces 48 and 49 of a prism 50, the diaphragm plate makes the two pencils 34 and 35 strike alternately a photocell 51 which via an amplifier 52 controls a motor 53. The ray pencil 35 traverses a test specimen, for instance a pherogram 54, the extinctions of which are controlled by the double diaphragm 20, 21 operated by the motor 53 through the agency of the means shown in detail in FIGS. 1 and 2. A pherogram is a strip of paper impregnated with buffer solution and covered at a definite place by a mixture the components of which in consequence of different electrophoretic mobilities and influenced by voltage travel at one and the same time over differently long stretches. The positions these components assume are made visible by individual coloring or adjuvants.

If the extinction, which changes in accordance with what part of the pherogram 54 is transilluminated, causes the light intensities of the pencils 34 and 35 to differ from each other, the result will be a current impulse in the photocell 51. This impulse is amplified to control the motor 53. The motor 53 causes the double diaphragm 20, 21 to be displaced at right angles to the ray pencils in such a manner as to balance the intensities of these two pencils. The diaphragm displacement corresponds to the magnitude of the extinction, which is either read off from means not shown in the drawing or recorded by the means illustrated in FIGS. 1 and 2.

I claim:

A device for measuring and recording extinction and absorption coefficients comprising a light-source emitting two beams in different directions, each of said beams being influenced by a system made up of a first convergent optical element having said light-source at its object-side focus, a slit, another convergent optical element, beam-interrupting means so coupled to beam-interrupting means of the other beam that only one of said two beams is interrupted at a time, said other convergent optical element imaging said slit in the plane of said interrupting means, at least one reflector, said reflector deflecting the beam to a photoelectric receiver serving both beams, and optical means imaging on said photoelectric receiver the plane of said interrupting means, said measuring and recording device further comprising a support for two measuring means influencing the intensity of said first beam, said support being displaceable transversely to the part of said first beam between said convergent optical elements, the zero lines of said measuring means being out of coincidence with each other and only one of said measuring means being effective at a time, the test specimen lying near the plane of said interrupting means and being transversely displaceable in said other beam, a motor controlled by photocurrents due to exposure of said photoelectric receiver, a spindle actuated by said motor and controlling both a stylus and a slide, on said slide a measurably rotatable guide for transmitting the displacement of said slide to said support and for adjusting one of said measuring means, entrainment means, and a cam-disc having two circular slideways of different radii, the difference of said radii corresponding to the space between said zero lines, said entrainment means being fixed to said cam-disc and slidable in said guide, said support having a lever and an arm and a spring, said cam-disc being linked to said lever and influenced by said spring to contact said arm, and the direction of displacement of said slide being at right angles to the direction of displacement of said support.

References Cited in the file of this patent

UNITED STATES PATENTS

| 1,919,182 | FitzGerald | July 18, 1933 |
| 1,999,023 | Sharp et al. | Apr. 23, 1935 |
| 2,410,550 | Padva | Nov. 5, 1946 |
| 2,469,935 | Sweet | May 10, 1949 |
| 2,528,924 | Vassy | Nov. 7, 1950 |